United States Patent
He et al.

(10) Patent No.: US 11,614,061 B2
(45) Date of Patent: Mar. 28, 2023

(54) DIESEL FUEL INJECTOR BASED ON HOLLOW SPRAY STRUCTURE INDUCED BY VORTEX CAVITATION IN NOZZLE

(71) Applicant: JIANGSU UNIVERSITY, Zhenjiang (CN)

(72) Inventors: Zhixia He, Zhenjiang (CN); Genmiao Guo, Zhenjiang (CN); Wei Guan, Zhenjiang (CN); Qian Wang, Zhenjiang (CN); Jianquan Wang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/890,178

(22) Filed: Aug. 17, 2022

(65) Prior Publication Data

US 2022/0389894 A1    Dec. 8, 2022

Related U.S. Application Data

(63) Continuation of application No. PCT/CN2020/137072, filed on Dec. 17, 2020.

(30) Foreign Application Priority Data

Sep. 30, 2020    (CN) .......................... 202011056867.0

(51) Int. Cl.
*F02M 61/18* (2006.01)
*F02M 61/10* (2006.01)

(52) U.S. Cl.
CPC ............ *F02M 61/18* (2013.01); *F02M 61/10* (2013.01)

(58) Field of Classification Search
CPC ..... F02M 61/18; F02M 61/10; F02M 61/1833
See application file for complete search history.

(56) References Cited

U.S. PATENT DOCUMENTS

| 9,470,197 B2 * | 10/2016 | Moore | F02M 61/1886 |
| 2016/0215745 A1 * | 7/2016 | Koeninger | F02M 61/1893 |

FOREIGN PATENT DOCUMENTS

| CN | 102182599 A | 9/2011 |
| CN | 102434345 A | 5/2012 |
| CN | 202983659 U | 6/2013 |
| CN | 104989573 A | 10/2015 |

(Continued)

OTHER PUBLICATIONS

Hua Wen et al., Effect of Pressure Chamber Structure on Cavitation and Gas Ingestion in Diesel Nozzle After End of Injection, "Transactions of CSICE", vol. 38, Issue 2, 2020, pp. 154-160; School of Mechanical and Electrical Engineering, Nanchang University, Nanchang 330031, China.

(Continued)

*Primary Examiner* — Steven M Cernoch

(57) ABSTRACT

A diesel fuel injector based on a hollow spray structure induced by vortex cavitation in a nozzle, including a needle valve, a nozzle body, a plurality of spray holes, and a sac chamber. An axis of the needle valve coincides with an axis of the nozzle body. The spray holes are evenly distributed on a head of the nozzle body, and each have a converging conical structure. An inlet end of the spray hole is communicated with the sac chamber. The sac chamber consists of a hemispherical cavity and a cylindrical cavity.

2 Claims, 3 Drawing Sheets

(56) References Cited

FOREIGN PATENT DOCUMENTS

| | | | |
|---|---|---|---|
| CN | 105332840 A | 2/2016 | |
| CN | 106150818 A | 11/2016 | |
| CN | 106948989 A | 7/2017 | |
| CN | 108197390 A | 6/2018 | |
| CN | 108561195 A | 9/2018 | |
| CN | 109681361 A | 4/2019 | |
| CN | 110801950 A | 2/2020 | |
| CN | 210714904 U | 6/2020 | |
| CN | 114060192 A | 2/2022 | |
| DE | 102016109765 A1 * | 12/2016 | ............. F02M 61/10 |
| DE | 102018209101 A1 * | 12/2019 | ........... F02M 61/047 |
| FR | 2876750 B1 | 9/2010 | |
| JP | 2007023950 A | 2/2007 | |
| JP | 2013019386 A | 1/2013 | |

OTHER PUBLICATIONS

Zhou Chen , Experimental Study of String Cavitation in Real-size Optical High-Pressure Common Rail Injector Nozzles and Its Effects on Spray, "China Master's Theses Full-text Database, Engineering Science and Technology II", No. 10, Oct. 15, 2019, pp. 20-70.

* cited by examiner

DIESEL FUEL INJECTOR BASED ON HOLLOW SPRAY STRUCTURE INDUCED BY VORTEX CAVITATION IN NOZZLE

CROSS-REFERENCE TO RELATED APPLICATIONS

This application is a continuation of International Patent Application No. PCT/CN2020/137072, filed on Dec. 17, 2020, which claims the benefit of priority from Chinese Patent Application No. 202011056867.0, filed on Sep. 30, 2020. The content of the aforementioned application, including any intervening amendments thereto, is incorporated herein by reference in its entirety.

TECHNICAL FIELD

This application relates to diesel fuel injection and atomization, and more particularly to a diesel fuel injector based on a hollow spray structure induced by vortex cavitation in a nozzle.

BACKGROUND

Diesel engine plays an important role in promoting the national economic growth and social operation. The high-pressure common rail fuel injection system greatly improves the atomization of the fuel and enhances the output power and torque of the diesel engine, and thus has become the mainstream development trend of the power of the diesel engine worldwide. As a core component linking the fuel injection with the jet atomization, the electrically controlled injector is vital for the development of the high-pressure common rail fuel injection technology. Currently, China has been predominated in the consumption and production of diesel engines, but the domestic electrically controlled injector still needs to be improved in operation performance, reliability, and consistency. Therefore, it is urgent to figure out the fuel jet spray atomization mechanism to accurately control the fuel injection, so as to optimize the combustion and emission performance of the diesel engine.

At present, the atomization of the high-pressure fuel jet mainly involves turbulence, aerodynamics, and cavitation. The turbulence in the nozzle causes unstable fluctuation on the surface of the fuel jet. Such small-scale disturbance amplifies the aerodynamic effect of the surrounding air and causes the breakup and atomization of the liquid jet. Considering that the time scale of the jet breakup process caused by the disturbance under the aerodynamic effect is much larger than that of the actual jet breakup process, the turbulence inside the nozzle is the main cause for the atomization of the liquid jet compared with the aerodynamics. The cavitation is a common gas-liquid two-phase flow in the nozzle of the diesel engine under high-pressure injection. On one hand, the cavitation flow increases turbulence energy inside the nozzle and intensifies the instability of the fuel jet. On the other hand, the generated cavitation bubbles will follow the fuel main flow to be sprayed out of the spray holes to trigger implosion, which leads to strong unstable disturbance, accelerating the jet breakup and atomization processes. The cavitation inside the nozzle can be divided into geometry-induced cavitation and vortex cavitation according to inducement. In the first aspect, when the fuel oil is sprayed out through the nozzle of the fuel injector, the change in the nozzle channel causes flow contraction and pressure drop, and cloud geometry-induction cavitation occurs near the wall surface of the spray hole. In the second aspect, when the fuel oil is sprayed out through the nozzle of the diesel engine, a low-pressure vortex core area is formed in the nozzle sac chamber and the spray hole due to the intense vortex flow, and the vortex cavitation is generated along the vortex core area. It has been demonstrated that compared with the turbulence inside the nozzle, the cavitation generated when fuel flows through the nozzle of the fuel injector has a more remarkable influence on the fuel atomization. In particular, the vortex cavitation can render the jet flow in the form of hollow spray, and thus greatly enlarges the spray cone angle. At the same time, the vortex cavitation has little effect on the nozzle hole and will hardly cause cavitation damage. However, the vortex cavitation intensity inside the nozzle of the diesel engine is unstable during the fuel injection, such that the vortex cavitation is difficult to be effectively applied to the fuel atomization.

Chinese Patent Publication No. 105332840A, titled "a method for performing pre-mix combustion by utilizing cavitation jet", provides a method for realizing gas-liquid two-phase oil jet injection by adopting a nozzle hole with a stepped sudden-expansion structure. However, this process is mainly dependent on the geometry-induced cavitation, and the cavitation damage to the nozzle is exacerbated. Chinese Patent Publications No. 108197390A (titled "an anti-cavitation optimization design method for a two-phase low-temperature liquid expansion machine") and No. 108561195A (titled "a method for effectively controlling vortex cavitation in a low-temperature liquid expansion machine") are intended to suppress the vortex cavitation in a hydraulic machine, thereby avoiding adverse effects on the mechanical properties. Moreover, Chinese Patent Publication No. 109681361A, titled "a fuel injection nozzle for enhancing spray based on vortex cavitation effect", discloses a fuel injector for strengthening spray by utilizing the vortex cavitation in a nozzle, but it is mainly designed for limiting the lift of a needle valve. In conclusion, it has still not been reported about the diesel fuel injector based on a hollow spray structure induced by vortex cavitation in a nozzle.

SUMMARY

To overcome the above deficiencies in the prior art, the present disclosure provides a diesel fuel injector based on a hollow spray structure induced by vortex cavitation in a nozzle. By optimizing the geometric structure of the diesel fuel injector, the vortex cavitation therein under different loads is strengthened, and thus effectively improving the fuel atomization.

Technical solutions of the present disclosure are described as follows.

This application provides a diesel fuel injector based on a hollow spray structure induced by vortex cavitation in a nozzle, comprising:

a needle valve;
a nozzle body;
a plurality of spray holes; and
a sac chamber;

wherein an axis of the needle valve coincides with an axis of the nozzle body; the plurality of spray holes are evenly distributed on a head of the nozzle body, and each have a converging conical structure; an inlet end of each of the plurality of spray holes is communicated with the sac chamber; the sac chamber is hemispherical, or consists of a hemispherical cavity and a cylindrical cavity with the same diameter as the hemispherical cavity; a radius of the hemispherical cavity is R, and a height of the sac chamber is H; and $0 < R \leq H$;

a diameter of the inlet end of each of the plurality of spray holes is $D_{in}$; a vertical distance between a center of a cross section of the inlet end of each of the plurality of spray holes and a bottom end of the sac chamber is h, and h<H; a distance between a bottom end face of the needle valve and an intersection of an axis of each of the plurality of spray holes and the axis of the needle valve is l;

wherein when $l_1 \leq 0$, $H > 1.5D_{in}$; $R < \frac{1}{2}H$; and $h > D_{in}$;

when $l_0 > 0$, $1.5D_{in} < H < 5D_{in}$; $R > \frac{3}{5}H$; and $1.2D_{in} < h < 3D_{in}$; and when $l_0 < 0$ and $l_1 > 0$, $1.5D_{in} < H < 5D_{in}$; t $R > \frac{3}{5}H$; and $1.2D_{in} < h < 3D_{in}$;

wherein $l_0$ is a minimum value of the l, and $l_1$ is a maximum value of the l when the needle valve reaches a maximum lift; and l=0 indicates that the intersection of the axis of each of the plurality of spray holes and the axis of the needle valve is located at the bottom end face of the needle valve;

l<0 indicates that the intersection of the axis of each of the plurality of spray holes and the axis of the needle valve is located above the bottom end face of the needle valve;

l>0 indicates that the intersection of the axis of each of the plurality of spray holes and the axis of the needle valve is located below the bottom end face of the needle valve;

when the needle valve is seated, the l reaches the minimum value $l_0$; as fuel injection starts, the needle valve is lifted and the l gradually increases until the needle valve reaches the maximum lift, and at this time the l reaches the maximum value $l_1$; and in an ending stage of the fuel injection, the l is gradually reduced from $l_1$ to $l_0$. In some embodiments, an inclination angle θ an inclination angle θ of each of the plurality of spray holes is set to 70°≤θ≤77.5°; the inclination angle θ is an included angle formed by the axis of each of the plurality of spray holes and the axis of the needle valve; a taper coefficient K of each of the plurality of spray holes is set to 1≤K≤3; the K is calculated as:

$$K = \frac{100(D_{in} - D_{out})}{L},$$

wherein $D_{out}$ represents a diameter of an outlet end of each of the plurality of spray holes; and L represents a length of each of the plurality of spray holes.

In some embodiments, a head of the needle valve is conical or truncated cone-shaped; when the head of the needle valve is conical, a conical vertex angle is an included angle $θ_n$ of the head of the needle valve, and 60°≤$θ_n$≤90°; and when the head of the needle valve is truncated cone-shaped, an included angle between two generatrixes of a cross section passing through an axis of the head of the needle valve is the included angle $θ_n$ of the head of the needle valve, and $θ_n$≤60°.

Compared to the prior art, the present disclosure has the following beneficial effects.

In the diesel fuel injector provided herein, by optimizing the geometric structure of the nozzle, the vortex cavitation in the diesel fuel injector under different loads is strengthened and stabilized, and thus effectively improving the fuel atomization.

Figure 1:
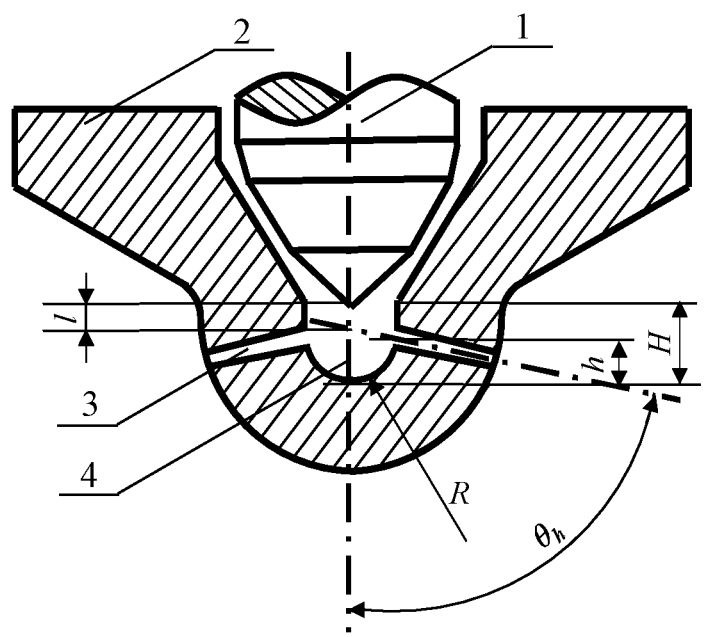
FIG. 1 schematically shows a structure of a nozzle of a diesel fuel injector according to an embodiment of the present disclosure.

In the drawings, 1, needle valve; 2, nozzle body; 3, spray hole; and 4, sac chamber.

DETAILED DESCRIPTION OF EMBODIMENTS

To make the objects, technical solutions, and advantages of the present disclosure clearer, the present disclosure will be further described in detail below with reference to the accompanying drawings and embodiments. It should be understood that the embodiments described herein are only used to explain the present disclosure, and are not intended to limit the present disclosure.

Figure 2:
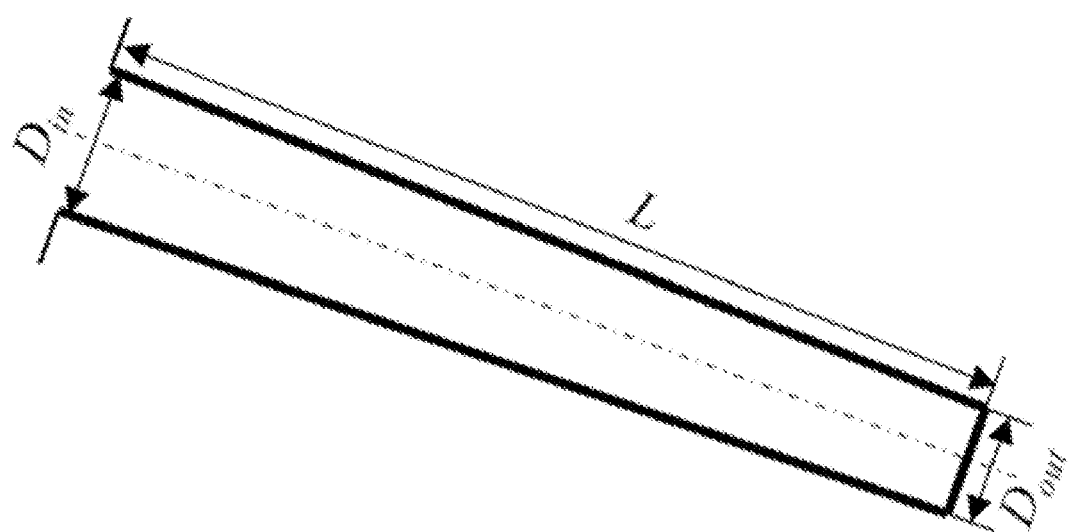
FIG. 2 is a partial enlarged view of a spray hole of the nozzle of the diesel fuel injector according to an embodiment of the present disclosure.

The present disclosure provides a diesel fuel injector based on a hollow spray structure induced by vortex cavitation in a nozzle. By enhancing and controlling the vortex cavitation in the nozzle, the fuel jet is in a hollow spray form, allowing for optimized atomization effect of the fuel jet. As shown in FIG. 1, a diesel fuel injector is illustrated, which includes a needle valve 1, a nozzle body 2, a plurality of spray holes 3, and a sac chamber 4. An axis of the needle valve 1 coincides with an axis of the nozzle body 2. The number of the plurality of spray holes 3 is 3-8. The plurality of spray holes 3 are evenly distributed on a head of the nozzle body 2, and each have a converging conical structure. The spray holes 3 having a converging conical structure can effectively inhibit geometric induction cavitation and enhance the vortex cavitation. FIG. 2 shows a partial enlarged view of the structure of the spray hole 3. The structural parameters of the diesel engine injector are designed, which specifically include a radius of the hemispherical cavity R of the sac chamber 4, a height H of the sac chamber 4, a taper coefficient K of the spray hole 3, an inclination angle θ of each of the plurality of spray holes 3, a distance l between the bottom end face of the needle valve 1 and an intersection of an axis of each of the plurality of spray holes 3 and the axis of the needle valve 1, and an hole opening height h of the spray hole 3.

The inclination angle θ of each of the plurality of spray holes 3 is set to 70°≤θ≤77.5°, which refers to an included angle formed by the axis of each of the plurality of spray holes 3 and the axis of the needle valve 1. The taper coefficient K of each of the plurality of spray holes 3 is set to 1≤K≤3, which is calculated as:

$$K = \frac{100(D_{in} - D_{out})}{L},$$

where $D_{in}$ and $D_{out}$ represent a diameter of an inlet end and an outlet end of each of the plurality of spray holes 3, respectively; and L represents a length of each of the plurality of spray holes 3.

Figure 3A:
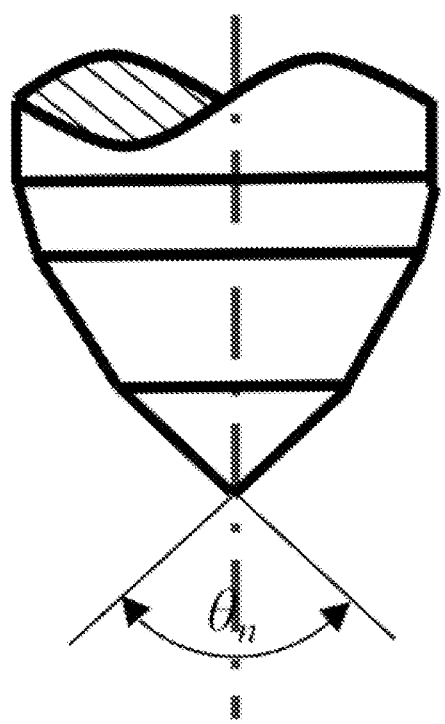
FIG. 3a schematically shows a structure of a needle valve with a conical head according to an embodiment of the present disclosure.
Figure 3B:
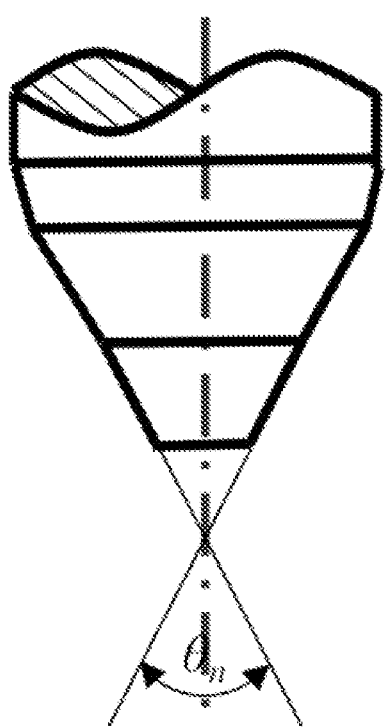
FIG. 3b schematically shows a structure of a needle valve with a truncated cone-shaped head according to an embodiment of the present disclosure.

The head of the needle valve 1 is conical or truncated cone-shaped. When the head of the needle valve 1 is conical, as shown in FIG. 3a, the bottom end face of the head of the needle valve 1 is a point, the vertex angle of the head of the needle valve 1 is the included angle $\theta_n$ of the head of the needle valve 1, where $60° \le \theta_n \le 90°$. When the head of the needle valve 1 is truncated cone-shaped, as shown in FIG. 3b, the bottom end surface of the head of the needle valve 1 is a surface, the included angle between two generatrixes of a cross section passing through an axis of the head of the needle valve is the included angle $\theta_n$ of the head of the needle valve 1, where $\theta_n < 60°$, and the height of the truncated cone is as high as possible within the allowable range of structure of the sac chamber.

When the needle valve 1 is seated, the distance l between a bottom end face of the needle valve 1 and an intersection of an axis of each of the plurality of spray holes 3 and the axis of the needle valve 1 reaches the minimum value $l_0$. Accompanying the fuel injection, the needle valve 1 is opened and the l gradually increases until the needle valve 1 reaches the maximum lift, and at this time the l reaches the maximum value $l_1$. In the ending stage of the fuel injection, the l is gradually reduced from $l_1$ to $l_0$. Specifically, the seating of the needle valve 1 refers to that the needle valve 1 cannot move downwards relative to the nozzle body 2.

l is the distance between a bottom end face of the needle valve 1 and an intersection of an axis of each of the plurality of spray holes 3 and the axis of the needle valve 1. $l_0$ is the minimum value of the l, and $l_1$ is the maximum value of the l when the needle valve 1 reaches the maximum lift.

The "positive" and "negative" of the l represent the relative position between the head of the needle valve 1 and intersection of the axis of each of the spray holes 3 and the axis of the needle valve 1:

l<0 indicates that the bottom end face of the needle valve 1 is closer to the bottom of the sac chamber 4 compared with the intersection of the axis of each of the plurality of spray holes 3 and the axis of the needle valve 1;

l>0 indicates that the intersection of the axis of each of the plurality of spray holes 3 and the axis of the needle valve 1 is closer to the bottom of the sac chamber 4 compared with the bottom end face of the needle valve 1; and l=0 indicates that the intersection of the axis of each of the plurality of spray holes 3 and the axis of the needle valve 1 is located at the bottom end face of the needle valve 1.

The sac chamber 4 consists of a hemispherical cavity and a cylindrical cavity with the same diameter as the hemispherical cavity. The radius of the hemispherical cavity is R, and the height of the sac chamber 4 is H, where $0 < R \le H$, and the height H of the sac chamber 4 is equal to the radius R of the hemispherical cavity plus the height of the cylindrical cavity.

The structural parameters R and H of the sac chamber 4 of the fuel injector are limited by the inlet diameter $D_{in}$ of each of the plurality of spray holes 3, and the hole-opening height h of each of the plurality of spray holes of the fuel injector refers to a vertical distance between a center of a cross section of the inlet end of each of the plurality of spray holes and a bottom end of the sac chamber, where h<H.

If $l_1 \le 0$, the height H of the sac chamber is $H > 1.5 D_{in}$, the radius R of the hemispherical cavity of the sac chamber is $R < \frac{1}{2}H$, and the hole-opening height h of the spray hole is $h > D_{in}$.

If $l_0 > 0$, the height H of the sac chamber is $1.5 D_{in} < H < 5 D_{in}$, the radius R of the hemispherical cavity of the sac chamber is $R < \frac{3}{5}H$, and the hole-opening height h of the spray hole is $1.2 D_{in} < h < 3 D_{in}$.

If $l_0 < 0$ and $l_1 > 0$, the height H of the sac chamber is $1.5 D_{in} < H < 5 D_{in}$, the radius R of the hemispherical cavity of the sac chamber is $R > \frac{3}{5}H$, and the hole-opening height h of the spray hole is $1.2 D_{in} < h < 3 D_{in}$.

Specifically, in actual use, if $l_1 < 0$, that is, 1 is always needed to be no more than 0 during the operation of the fuel injector, the height H of the sac chamber is designed to be $H > 1.5 D_{in}$, the radius R of the hemispherical cavity of the sac chamber is designed to be $R < \frac{1}{2}H$, and the hole-opening height h is designed to be $h > D_{in}$. If $l_0 > 0$, that is, l is always needed to be more than 0 during the operation of the fuel injector, the height H of the sac chamber is designed to be $1.5 D_{in} < H < 5 D_{in}$, the radius R of the hemispherical cavity of the sac chamber is designed to be $R > \frac{3}{5}H$, and the hole-opening height h is designed to be $1.2 D_{in} < h < 3 D_{in}$. If $l_0 < 0$ and $l_1 > 0$, that is, 1 is always needed to be less than 0 or greater than 0 during the operation of the injector, the height H of the sac chamber is designed to be $1.5 D_{in} < H < 5 D_{in}$, the radius R of the hemispherical cavity of the sac chamber is designed to be $R > \frac{3}{5}H$, and the hole-opening height h is designed to be $1.2 D_{in} < h < 3 D_{in}$. The parameters H, R and h of the injector are all fixed values, and are not changed after the parameters are determined in the actual use.

In addition, during the operation of the fuel injector, l is at the position of $l_1$ for most of the time. Therefore, in actual use, whether "$l_0 > 0$", or "$l_0 < 0$ and $l_1 > 0$" is needed, $l_1$ is always greater than 0, that is, during the operation of the fuel injector, l is greater than 0 for most of the time. Hence, the values of the parameters H, R and h when "$l_0 < 0$ and $l_1 > 0$" are required to be consistent with the range of those when "$l_0 > 0$".

Figure 4A:
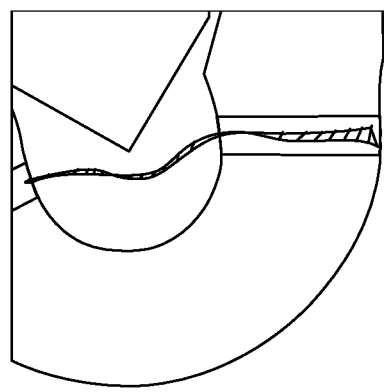
FIG. 4a schematically illustrates vortex cavitation flow state in the nozzle according to an embodiment of the present disclosure.
Figure 4B:
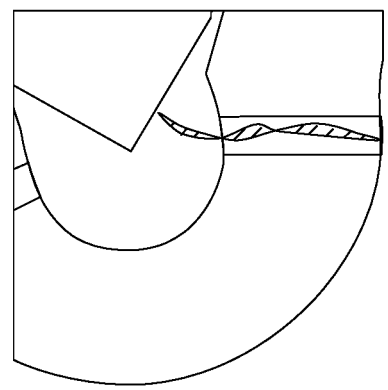
FIG. 4b is a schematic diagram of two typical vortex-line cavitation flow states in the nozzle according to another embodiment of the present disclosure.

The fuel injector continuously generates strong vortex cavitation in the nozzle during the fuel injection, and FIGS. 4a and 4b provide schematic diagrams of two typical vortex cavitation flow states in the nozzle.

Figure 5:
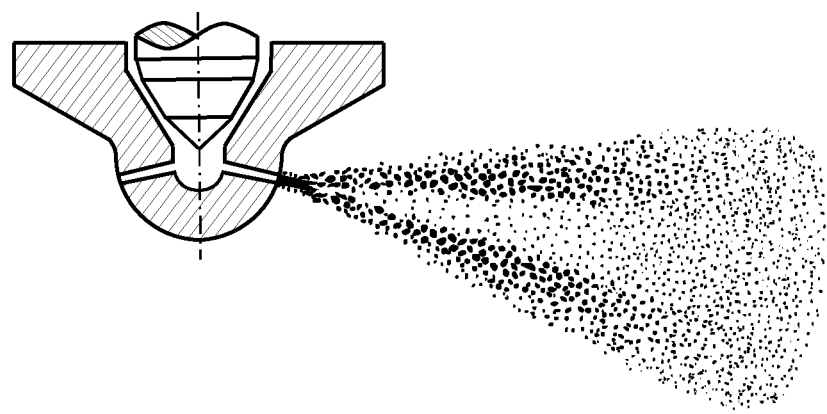
FIG. 5 schematically illustrates fuel atomization in a hollow spray structure formed in the diesel fuel injector according to an embodiment of the present disclosure.

The fuel jet of the injector presents a hollow spray structure with rotational flow, as shown in FIG. 5.

The above embodiments are only used to illustrate the design concepts and features of the present disclosure, and the purpose thereof is to enable one of ordinary skilled in the art to understand the contents of the present disclosure and implement the present disclosure, and are not intended to limit the scope of protection of the present disclosure. Therefore, equivalent changes or modifications made according to the principles and design ideas disclosed in the present disclosure shall fall within the scope of the protection of the present disclosure.

What is claimed is:

1. A diesel fuel injector based on a hollow spray structure induced by vortex cavitation in a nozzle, comprising:
   a needle valve;
   a nozzle body;
   a plurality of spray holes; and
   a sac chamber;
   wherein an axis of the needle valve coincides with an axis of the nozzle body; the plurality of spray holes are evenly distributed on a head of the nozzle body, and each have a converging conical structure; an inlet end of each of the plurality of spray holes is communicated with the sac chamber; the sac chamber is hemispherical, or consists of a hemispherical cavity and a cylindrical cavity with the same diameter as the hemispherical cavity; a radius of the hemispherical cavity is R, and a height of the sac chamber is H; and $0<R\leq H$;

a diameter of the inlet end of each of the plurality of spray holes is $D_{in}$; a vertical distance between a center of a cross section of the inlet end of each of the plurality of spray holes and a bottom end of the sac chamber is h, and $h<H$; a distance between a bottom end face of the needle valve and an intersection of an axis of each of the plurality of spray holes and the axis of the needle valve is l;

wherein when $l_1 \leq 0$, $H>1.5D_{in}$; $R<\frac{1}{2}H$; and $h>D_{in}$;

when $l_0>0$, $1.5D_{in}<H<5D_{in}$; $R>\frac{3}{5}H$; and $1.2D_{in}<h<3D_{in}$; and when $l_0<0$ and $l_1>0$, $1.5D_{in}<H<5D_{in}$; t $R>\frac{3}{5}H$; and $1.2D_{in}<h<3D_{in}$;

wherein $l_0$ is a minimum value of the l, and $l_1$ is a maximum value of the l when the needle valve reaches a maximum lift;

a head of the needle valve is conical or truncated cone-shaped; when the head of the needle valve is conical, a conical vertex angle is an included angle $\theta_n$ of the head of the needle valve, and $60°\leq\theta_n<90°$; and when the head of the needle valve is truncated cone-shaped, an included angle between two generatrixes of a cross section passing through an axis of the head of the needle valve is the included angle $\theta_n$ of the head of the needle valve, and $\theta_n\leq 60°$; and l=0 indicates that the intersection of the axis of each of the plurality of spray holes and the axis of the needle valve is located at the bottom end face of the needle valve;

l<0 indicates that the intersection of the axis of each of the plurality of spray holes and the axis of the needle valve is located above the bottom end face of the needle valve;

l>0 indicates that the intersection of the axis of each of the plurality of spray holes and the axis of the needle valve is located below the bottom end face of the needle valve;

when the needle valve is seated, the l reaches the minimum value $l_0$; as fuel injection starts, the needle valve is lifted and the l gradually increases until the needle valve reaches the maximum lift, and at this time the l reaches the maximum value $l_1$; and in an ending stage of the fuel injection, the l is gradually reduced from $l_1$ to $l_0$.

2. The diesel fuel injector of claim 1, wherein an inclination angle θ of each of the plurality of spray holes is set to $70°\leq\theta\leq 77.5°$; the inclination angle θ is an included angle formed by the axis of each of the plurality of spray holes and the axis of the needle valve; a taper coefficient K of each of the plurality of spray holes is set to $1\leq K\leq 3$; the K is calculated as $$K = \frac{100(D_{in} - D_{out})}{L},$$

wherein $D_{out}$ represents a diameter of an outlet end of each of the plurality of spray holes; and L represents a length of each of the plurality of spray holes.

* * * * *